J. R. CORBETT.
PIPE CLAMP.
APPLICATION FILED APR. 18, 1918.
1,317,962.
Patented Oct. 7, 1919.
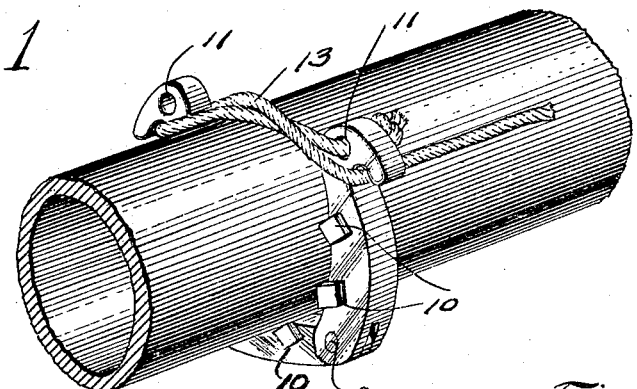
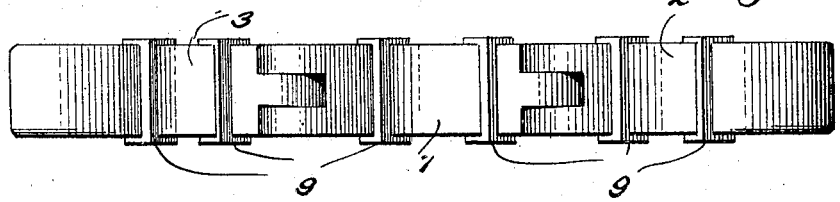
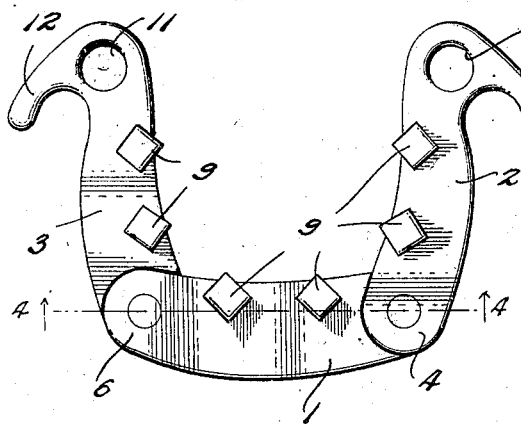
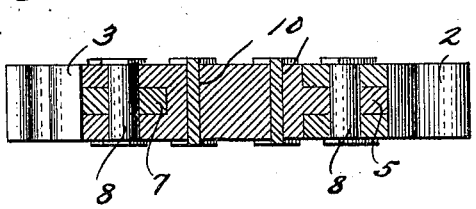
Inventor
J. R. Corbett
By R. Morgan Elliott & Co.
Attorney

UNITED STATES PATENT OFFICE.

JAY R. CORBETT, OF NEW WILSON, OKLAHOMA.

PIPE-CLAMP.

1,317,962.     Specification of Letters Patent.     Patented Oct. 7, 1919.

Application filed April 18, 1918. Serial No. 229,299.

*To all whom it may concern:*

Be it known that I, JAY R. CORBETT, a citizen of the United States, residing at New Wilson, in the county of Carter and State of Oklahoma, have invented certain new and useful Improvements in Pipe-Clamps, of which the following is a specification.

This invention relates to pipe clamps.

The object of the invention is to provide an improved form of pipe clamp for use in the manipulation of pipes and well casings in the digging of oil or similar wells. More particularly, it is the object of the invention to provide a clamp or grip which will positively hold casings or pipes of a comparatively wide range of sizes, and furthermore, it is the intention to provide a pipe clamp or grip which may be successfully employed in any position. That is, the device may be clamped around the pipe in that position in which it happens that the device is picked up, without reference to a "top" or "bottom" or "right or wrong" way.

Also, by the improved device of this invention, the ends may be lashed together across a pipe body in either of two ways, and it is also capable of arrangement upon the pipe without removing it therefrom in order to secure a new adjustment, or to change the direction of rotation in removing or "backing out" a casing.

It is also an object of the invention to provide a construction whereby the gripping elements proper may be renewed, upon occasion, at a minimum cost and with a slight expenditure of time, thereby lengthening the life of the implement and insuring its utility.

With the above objects in view, and such others relating to the details of construction as may hereinafter appear, my invention will now be fully set forth and described reference being had to the accompanying drawings, in which like reference characters indicate like parts throughout, and:—

Figure 1 is a perspective view of a section of a pipe or casing showing the application of my invention thereto.

Fig. 2 is an elevation looking into the device in its extended position.

Fig. 3 is a plan view.

Fig. 4 is a section on the line 4—4 of Fig. 3.

Referring more particularly to the drawings, 1 represents a middle body to whose extremities are hinged the bodies 2 and 3, the body 2 having the forked hinge portion 4 which incloses a hinge tongue 5 and the opposite end of the body 1 having the forked portion 6 which incloses a hinge tongue 7 of the body 3, hinge pins 8 removably connecting the elements 1, 2 and 3 together. The bodies 1, 2 and 3 are each slightly arced, so that when assembled, they will provide an inclosure which may be adjusted around a pipe casing in such a manner as to bring all or most all of the gripping elements or bits 9 into contact with the periphery of the pipe or casing.

Said bits or gripping elements 9 are cross-sectionally rectangular bodies preferably formed of steel whose corners may be selectively projected beyond the inner faces of the bodies 1, 2 and 3 by being driven into sockets 10 cut within said bodies, the bits engaging the sockets preferably by a driving fit.

The free extremity of each body 2 and 3 is provided with an eye 11 and an outwardly and rearwardly turned hook 12, and within one or both eyes 11 is secured the end of the lashing cable 13, as shown in Fig. 1, this arrangement permitting the attachment of the device to a casing in whatever position it might be picked up, and permitting it to be slid from one end to the other of the casing and employed without reversing the device.

The manner of use of the device has been clearly brought out in the course of the foregoing description so that a rehearsal of its operation is not deemed necessary at this point, but particular attention is called to the above-mentioned feature of utility which permits the device to be employed for turning a casing in either direction without removing the device or reversing it, since it will retain its grip for screwing the casing into position, or unscrewing or "backing the casing out".

What I claim as my invention is:—

1. A pipe clamp comprising a plurality of bodies hingedly connected together, an eyelet and hook on one of the said bodies, and a hook on the other of said bodies whereby a cable may be anchored in the eyelet in the first-named body, passed over and under the hook of the second-named body and back under the hook of the first-named body to draw said bodies in pipe-engaging position and pipe-gripping elements rigidly secured to the inner face of said bodies.

2. A pipe clamp comprising a plurality of bodies hingedly connected together having transverse slots in their inner faces, rectangular gripping elements rigidly secured to said slots and projecting beyond the inner faces of said body, an eyelet and hook at the extremity of one of said bodies and a hook at the extremity of the other of said bodies whereby the gripping elements and bodies may be fastened to and in engagement with the pipe.

In testimony whereof I affix my signature,

JAY R. CORBETT.

Copies of this patent may be obtained for five cents each, by addressing the "Commissioner of Patents, Washington, D. C."